(12) United States Patent
Uema (10) Patent No.: US 10,276,133 B2
(45) Date of Patent: Apr. 30, 2019

(54) PROJECTOR AND DISPLAY CONTROL METHOD FOR DISPLAYING SPLIT IMAGES

(71) Applicant: SEIKO EPSON CORPORATION, Tokyo (JP)

(72) Inventor: Shinya Uema, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/557,040

(22) PCT Filed: Mar. 11, 2016

(86) PCT No.: PCT/JP2016/001369
§ 371 (c)(1),
(2) Date: Sep. 8, 2017

(87) PCT Pub. No.: WO2016/147629
PCT Pub. Date: Sep. 22, 2016

(65) Prior Publication Data
US 2018/0061371 A1 Mar. 1, 2018

(30) Foreign Application Priority Data
Mar. 17, 2015 (JP) .................................. 2015-053040

(51) Int. Cl.
*G09G 5/00* (2006.01)
*G09G 5/14* (2006.01)
(Continued)

(52) U.S. Cl.
CPC ............... *G09G 5/14* (2013.01); *G03B 17/54* (2013.01); *G03B 21/14* (2013.01); *G03B 21/26* (2013.01);
(Continued)

(58) Field of Classification Search
None
See application file for complete search history.

(56) References Cited

U.S. PATENT DOCUMENTS

| 8,144,262 B2 * | 3/2012 | Su ........................... G03B 21/00 348/189 |
| 9,268,520 B1 * | 2/2016 | Cederlof ................... G06F 3/16 |

(Continued)

FOREIGN PATENT DOCUMENTS

| JP | 2006-091121 A | 4/2006 |
| JP | 2007-272365 A | 10/2007 |
| JP | 2012-185630 A | 9/2012 |

OTHER PUBLICATIONS

Jun. 7, 2016 International Search Report issued in International Patent Application No. PCT/JP2016/001369.

*Primary Examiner* — David D Davis
(74) *Attorney, Agent, or Firm* — Oliff PLC (57) ABSTRACT

A projector includes: a projecting section that projects an image onto a projection surface; an imaging section that captures the image projected on the projection surface and a person located between the projecting section and the projection surface, and obtain a captured image; a specifying section that specifies a split position of the projection surface based on a position of the person in the captured image; and a display control section that splits the projection surface into a plurality of areas at the split position specified by the specifying section and controls the projecting section so as to project different images in the plurality of areas.

12 Claims, 6 Drawing Sheets

(51) Int. Cl.
*G09G 5/37* (2006.01)
*G09G 5/38* (2006.01)
*H04N 9/31* (2006.01)
*G03B 17/54* (2006.01)
*G03B 21/14* (2006.01)
*G03B 21/26* (2006.01)
*G09G 5/377* (2006.01)

(52) U.S. Cl.
CPC ............... *G09G 5/00* (2013.01); *G09G 5/37* (2013.01); *G09G 5/377* (2013.01); *G09G 5/38* (2013.01); *H04N 9/31* (2013.01); *H04N 9/3182* (2013.01); *H04N 9/3194* (2013.01)

(56) References Cited

U.S. PATENT DOCUMENTS

| | | | |
|---|---|---|---|
| 2005/0117132 A1* | 6/2005 | Agostinelli | H04N 5/7416 353/122 |
| 2006/0028624 A1* | 2/2006 | Kaise | G03B 21/26 353/85 |
| 2010/0177929 A1* | 7/2010 | Kurtz | G06K 9/00228 382/103 |
| 2014/0218300 A1 | 8/2014 | Muraki et al. | |

* cited by examiner

PROJECTOR AND DISPLAY CONTROL METHOD FOR DISPLAYING SPLIT IMAGES

TECHNICAL FIELD

The present invention relates to a technique of splitting an image area in a projector.

BACKGROUND ART

In the case where an image is projected onto a screen by a projector, when a person (e.g., a presenter who makes a presentation) is located between the projector and the screen, various problems are caused. To the presenter, for example, the glare of light projected from the projector is obstructive in making the presentation. In order to cope with such a problem, a technique of reducing the glare is known (e.g., PTL 1).

CITATION LIST

Patent Literature

PTL 1: JP-A-2006-91121

SUMMARY OF INVENTION

Technical Problem

When the presenter takes an action such as crossing a projection surface, the presenter may have some kind of intention (e.g., to indicate a specific position on an image area) regarding the presentation. The technique disclosed in PTL 1 does not focus on such a viewpoint, and an object thereof is to merely reduce the glare.

On the other hand, the invention provides a technique of controlling an image area according to the position of a person in front of a projection surface.

Solution to Problem

The invention provides a projector including: a projecting section that projects images onto a projection surface; an imaging section that captures the images projected on the projection surface; a specifying section that specifies a split position of the projection surface based on a position of a person in at least one of the images captured by the imaging section, the person is located between the projecting section and the projection surface; and a display control section that splits the projection surface into a plurality of areas at the split position specified by the specifying section and controls the projecting section so as to project different images in the plurality of areas.

According to the projector, the image area can be split according to the position of the user in front of the projection surface.

The imaging section may capture the image projected on the projection surface over time, and the specifying section may dynamically specify the split position according to a temporal change in the position of the person included in a plurality of images captured over time by the imaging section.

According to the projector with this configuration, the split position of the image area can be dynamically determined according to the position of the user in front of the projection surface.

The projector may further include a setting section that sets an operating mode of the specifying section to any of a plurality of operating modes including a first mode in which the split position is dynamically specified from the plurality of images captured by the imaging section and a second mode in which the split position is statically specified from one image of the plurality of images captured by the imaging section.

According to the projector with this configuration, it is possible to switch the operating mode between the mode in which the split position is dynamically specified and the mode in which the split position is statically specified.

The projector may further include an input section that accepts input of video signals from a plurality of video supply devices, the imaging section may capture an image including an area outside the image projected by the projecting section, and when the person moves from outside to inside the image projected by the projecting section, the display control section may cause the projecting section to project an image including an image object for selecting one video supply device from the plurality of video supply devices.

According to the projector with this configuration, an image to be displayed on the image area after splitting can be selected by the user.

The display control section may cause the projecting section to project an image including an image object for inputting an instruction to stop movement of the split position.

According to the projector with this configuration, the instruction to stop the movement of the split position can be easily input.

The projector may further include: a detecting section that detects a position of a pointing element on the image projected on the projection surface; and a drawing section that draws a line according to a trajectory of the position detected by the detecting section, the display control section may cause the projecting section to project an image including the line drawn by the drawing section, and when the person moves from inside to outside the image projected by the projecting section, the display control section may cause the projecting section to project an image in which the line drawn by the drawing section is erased.

According to the projector with this configuration, the line drawn according to the position of the pointing element can be easily erased.

The projector may further include: a detecting section that detects a position of a pointing element on the image projected on the projection surface; and a drawing section that draws a line according to a trajectory of the position detected by the detecting section, the display control section may cause the projecting section to project an image including the line drawn by the drawing section, and when the person moves from outside to inside the image projected by the projecting section, the display control section may display an image including the line drawn by the drawing section, in one area of the plurality of areas.

According to the projector with this configuration, an area where a line is drawn by the drawing section can appear with the movement of the user.

Further, the invention provides a display control method including: a step of projecting, by a projecting section, images onto a projection surface; a step of capturing the images projected on the projection surface; a step of specifying a split position of the projection surface based on a position of a person in at least one of the captured images, the person is located between the projecting section and the projection surface; and a step of splitting the projection surface into a plurality of areas at the specified split position and projecting different images in the plurality of areas.

According to the display control method, the image area can be split according to the position of the user in front of the projection surface.

DESCRIPTION OF EMBODIMENTS

1. Configuration

Figure 1:
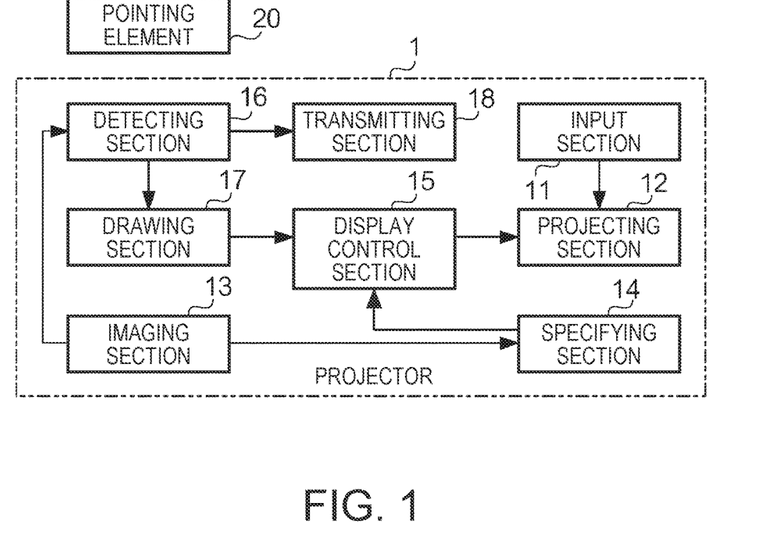
FIG. 1 is a diagram showing a functional configuration of a projector 1 according to an embodiment.

FIG. 1 is a diagram showing a functional configuration of a projector 1 according to an embodiment. The projector 1 includes an input section 11, a projecting section 12, an imaging section 13, a specifying section 14, a display control section 15, a detecting section 16, a drawing section 17, and a transmitting section 18.

The input section 11 accepts input of video signals from a plurality of video supply devices (not shown). The projecting section 12 projects images onto a projection surface. The imaging section 13 captures the images projected on the projection surface over time. The specifying section 14 specifies a split position of the projection surface based on the position of a person in at least one image of a plurality of images captured by the imaging section 13, and the person is located between the projecting section 12 and the projection surface. The display control section 15 splits the projection surface into a plurality of areas at the split position specified by the specifying section 14, and controls the projecting section 12 so as to project different images in the plurality of areas. The detecting section 16 detects the position of a pointing element 20 on the image projected on the projection surface. The drawing section 17 draws a line according to the trajectory of the position detected by the detecting section 16. The transmitting section 18 transmits information indicating the position of the pointing element 20 detected by the detecting section 16, to an external device (e.g., one device of the plurality of video supply devices).

In this example, the projector 1 operates in any of a plurality of operating modes including a first mode and a second mode. The drawing section 17 is a function to be enabled in the first mode, and draws a line according to the trajectory of the pointing element 20 on an image area. It should be noted that, in this example, the "image area" is an image area that is projected on a screen or a wall surface. The display control section 15 displays the line drawn by the drawing section 17 on a background (e.g., an image according to a video signal from the video supply device) in a superimposed manner. Hereinafter, the first mode is referred to as an "interactive mode" in a sense that the first mode is a mode in which the line in response to the operation of the pointing element 20 performed by the user is drawn on the image area.

The transmitting section 18 is a function to be enabled in the second mode, and transmits information (e.g., coordinates in a coordinate system defined in the image area) indicating the position of the pointing element 20 on the image area, to the video supply device. When the video supply device is an information processor such as a personal computer (PC), this information is used as input of a pointing device (e.g., mouse operation). For example, when the user moves the pointing element 20 on the image area, a mouse cursor moves following the movement. This mouse cursor is drawn by the video supply device. Hereinafter, the second mode is referred to as a "PC mode" in a sense that the second mode is a mode in which the mouse cursor of the video supply device moves in response to the operation of the pointing element 20 performed by the user.

Figure 2:
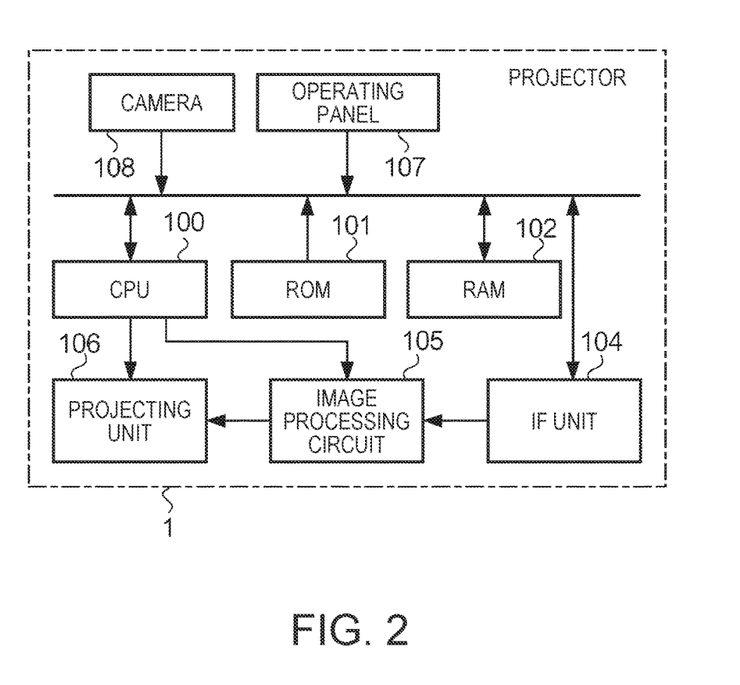
FIG. 2 is a diagram showing a hardware configuration of the projector 1.

FIG. 2 is a diagram showing a hardware configuration of the projector 1. The projector 1 includes a CPU (Central Processing Unit) 100, a ROM (Read Only Memory) 101, a RAM (Random Access Memory) 102, an IF unit 104, an image processing circuit 105, a projecting unit 106, an operating panel 107, and a camera 108.

The CPU 100 is a control device that controls each part of the projector 1. The ROM 101 is a non-volatile storage device that stores various kinds of programs and data. The RAM 102 is a volatile storage device that stores data, and functions as a work area when the CPU 100 executes processing.

The IF unit 104 is an interface that mediates the exchange of signals or data between the projector 1 and an external device. The IF unit 104 includes terminals (e.g., a VGA terminal, a USB terminal, a wired LAN interface, an S terminal, an RCA terminal, an HDMI (High-Definition Multimedia Interface: registered trademark) terminal, a microphone terminal, etc.) and a wireless LAN interface for exchanging signals or data with an external device. These terminals may include a video output terminal in addition to a video input terminal. The IF unit 104 may accept input of video signals from a plurality of different video supply devices.

The image processing circuit 105 performs predetermined image processing (e.g., size change, trapezoidal correction, etc.) on a video signal that is input thereto (hereinafter referred to as an "input video signal").

The projecting unit 106 projects, according to the video signal on which the image processing has been performed, an image on the projection surface such as a screen or a wall surface. The projecting unit 106 includes a light source, an optical modulator, and an optical system (all of which are not shown). The light source includes a lamp such as a high-pressure mercury lamp, a halogen lamp, or a metal halide lamp, or a solid-state light source such as an LED (Light-Emitting Diode) or a laser diode, and a driver circuit therefor. The optical modulator is a device that modulates, according to the video signal, the light emitted from the light source. The optical modulator includes, for example, a liquid crystal panel or a DMD (Digital Mirror Device) and a driver circuit therefor. It should be notes that the liquid crystal panel may be transmissive or reflective. The optical system is composed of an element that projects the light modulated by the optical modulator onto a screen, and the like, and includes, for example, a mirror, a lens, and a prism. The light source and the optical modulator may be provided for each of color components.

The operating panel 107 is an input device for the user to input an instruction to the projector 1, and includes, for example, a keypad, a button, or a touch panel.

The camera 108 is a camera for specifying the position of the pointing element 20. In this example, the pointing element 20 includes a light emitter (e.g., an infrared-emitting diode) at a pen tip, a pressure sensor, and a control circuit (all of which are not shown). When the pressure sensor detects that the pen tip touches an object (the projection surface, etc.), the control circuit causes the light emitter to emit light in a predetermined light-emitting pattern. The camera 108 is an infrared camera, and captures an image of the projection surface. The CPU 100 specifies the position of the pointing element 20 and a corresponding event from the image captured by the camera 108.

The event relating to the pointing element 20 includes, for example, a pen-down event and a pen-up event. The pen-down event is an event indicating that the pointing element 20 is touching a display surface (in this example, a screen or a wall surface). The pen-down event includes coordinates indicating the position touched by the pointing element 20. The pen-up event is an event indicating that the pointing element 20 having been touching the display surface moved away from the display surface. The pen-up event includes coordinates indicating the position of the display surface from which the pointing element 20 moved away.

It should be noted that the camera 108 can capture an image of an area wider than an effective pixel area of an image (that is, outside the image area) projected by the projecting unit 106. That is, even when the pointing element 20 is located outside the image area (if within a certain area), the projector 1 can detect the position of the pointing element 20.

In the embodiment, the camera 108 is used to specify the position of a person in front of the projection surface, in addition to the detection of the position of the pointing element 20.

The IF unit 104 is an example of the input section 11. The projecting unit 106 is an example of the projecting section 12. The camera 108 is an example of the imaging section 13. The CPU 100 is examples of the specifying section 14, the display control section 15, the detecting section 16, the drawing section 17, and the transmitting section 18.

2. Operation

Figure 3:
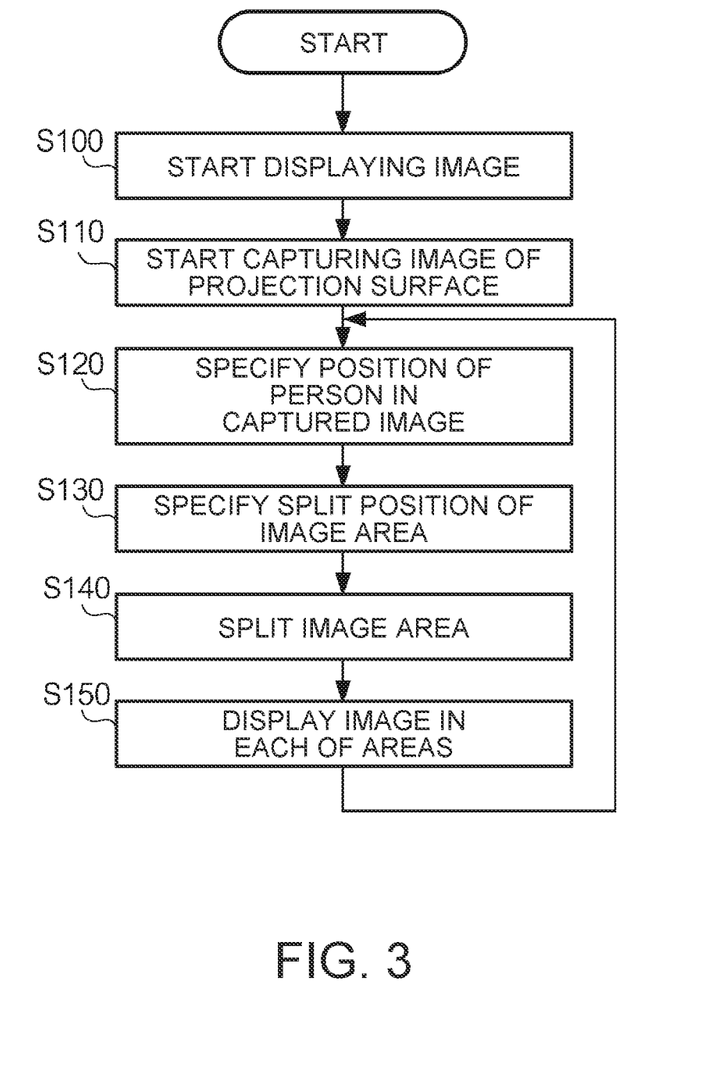
FIG. 3 is a flowchart showing the operation of the projector 1 according to an embodiment.

FIG. 3 is a flowchart showing the operation of the projector 1 according to an embodiment. The flow of FIG. 3 starts with, for example, power-on of the projector, or input of an explicit instruction from the user.

In Step S100, the CPU 100 starts displaying an image. In the following, the "displaying an image" means that the CPU 100 controls the projecting unit 106 to project an image on a screen. The image projected in this case is, for example, an image according to a video signal supplied from one video supply device selected from the video supply devices (e.g., a PC or a DVD player) connected via the IF unit 104. Hereinafter, the image projected on the screen is referred to as a "projected image" especially when distinguished from the image captured by the camera 108. The projected image is an image according to the input video signal, and does not include other images (e.g., a person located between the projecting unit 106 and the screen) than the image according to the input video signal.

In Step S110, the CPU 100 controls the camera 108 so as to start capturing an image of the projection surface. The image captured by the camera 108 is written in the RAM 102 at predetermined time intervals. Hereinafter, the image captured by the camera 108 is referred to as a "captured image" especially when distinguished from the image projected on the screen. In this example, the camera 108 captures an image of an area wider than an effective pixel area of the projected image, so that the captured image includes a person located between the projecting unit 106 and the screen, and the shadow of the person.

In Step S120, the CPU 100 analyzes the captured image, and specifies, if a person is pictured in the captured image, the position of the person. The position as used herein means a position on the plane of the captured image. A well-known technique is used as a specific method of analyzing the captured image and specifying the portion where the person is pictured.

In Step S130, the CPU 100 specifies a split position of the image area. In this example, the direction in which the image area is split is previously determined (e.g., split into right and left areas), and a position in one direction (e.g., a position in the horizontal direction, i.e., an x-coordinate) may be specified as the split position. Specifically, the split position is specified, for example, as follows. The CPU 100 specifies a representative point from the portion where the person is pictured, which is specified in Step S120. An algorithm to specify the representative point from the portion where the person is pictured is previously determined. The CPU 100 specifies coordinates of the representative point as the split position.

As the algorithm, for example, the following one is used.
The moving direction of the person pictured is specified from the plurality of captured images obtained over time.
The foremost point of the portion where the person is pictured, in the moving direction, is defined as a representative point.

In Step S140, the CPU 100 splits the image area at the specified split position. For example, the image area is split into two areas in the horizontal direction.

In Step S150, the CPU 100 displays different images in the split two areas. In this example, the image according to the video signal supplied from the video supply device (the image that has been displayed since Step S100) is displayed in one area, while an image of a whiteboard is displayed in the other area. The "whiteboard" herein is one of functions provided in the interactive mode of the projector 1, which is a function of displaying an image in which the line drawn according to the trajectory of the pointing element 20 is superimposed on a monochrome (e.g., white) background.

After finishing the processing in Step S150, the CPU 100 moves processing again to Step S120. The processing from Step S120 to Step S150 is repeatedly executed until a predetermined termination condition (e.g., an explicit instruction of termination has been input from the user, etc.) is satisfied.

According to the embodiment as has been described above, the image area can be split according to the position of the user in front of the projection surface.

FIG. 4 is a diagram showing a specific example of splitting the image area. At a time t11 (FIG. 4(A)), a user U who is a presenter is outside an image area SC (the right outside). In this state, the image area SC is not split, and an image IM1 (e.g., a slide for a presentation) according to a video signal supplied from a video supply device is displayed. After this, the user U starts walking from outside to inside the image area SC.

Figure 4A:
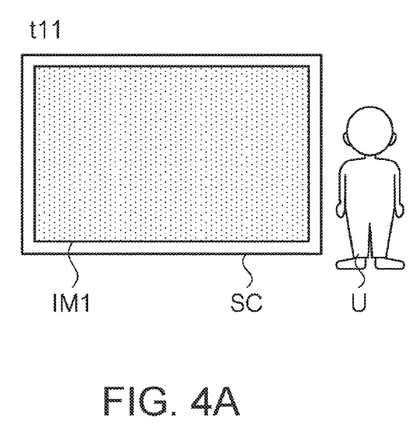
FIG. 4 is a diagram showing a specific example of splitting an image area.
Figure 4B:
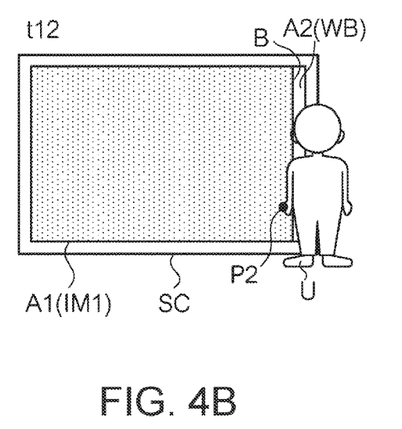

At a time t12 (FIG. 4(B)), the user U is located in the vicinity of the right side of the image area SC, and is pictured in the image area. A representative point P2 at this time is the foremost point in the moving direction (from the right to the left), that is, a point located at the leftmost of the portion where the user U is pictured. A line B passing through the representative point P2 and parallel to the right and left sides is a boundary line for splitting the image area. It should be noted that the line B itself may be actually displayed, or may be an imaginary line that is not displayed. An area to the left of the boundary line B is referred to as an area A1, while an area to the right thereof is referred to as an "area A2". In this example, in the area A1 and the area A2, the existing image IM1 is displayed in an area (in this example, the area A1) located on the downstream side (destination side) of the moving direction, while a new image WB is displayed in an area (in this example, the area A2) located on the upstream side (origin side) of the moving direction. The image WB is an image provided with the whiteboard function described previously.

Figure 4C:
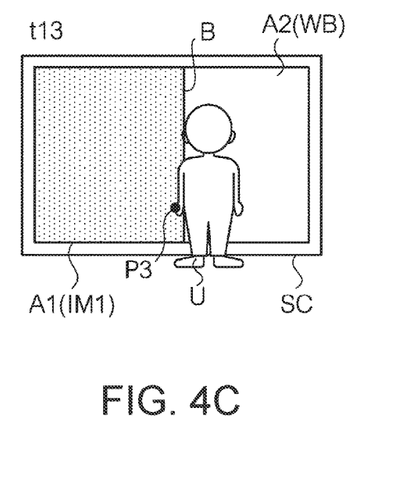

At a time t13 (FIG. 4(C)), the user U moves further to the left from the position at the time t12. A representative point P3 is a point located at the leftmost of a portion where the user U is pictured. The area A2 is expanded and the area A1 is narrowed, compared with those at the time t12.

Figure 4D:
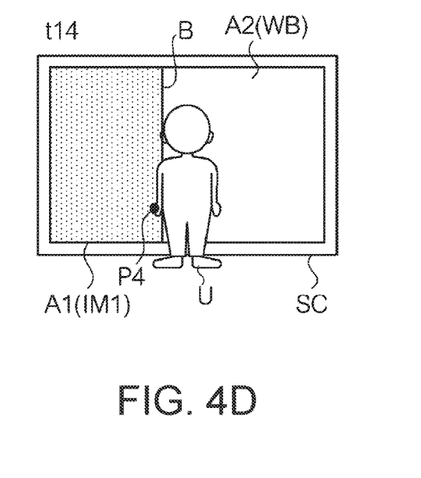

At a time t14 (FIG. 4(D)), the user U moves further to the left from the position at the time t13. A representative point P4 is a point located at the leftmost of a portion where the user U is pictured. The user U stops at this position and starts writing, with the pointing element 20, on the image WB (area assigned with the whiteboard function) expanded on the right side when facing the drawing.

According to Operating Example 1, even when the user U does not perform an operational input to indicate the split position of an image, the split position of the image on the image area is automatically determined in association with the movement of the user U. Especially in this example, the whiteboard WB appears in association with the movement of the user U, and therefore, this example is effective in a scene such as when the user wants to write on the board during a presentation.

3. Modified Examples

The invention is not limited to the embodiments described above, and various modifications can be implemented. Hereinafter, some modified examples will be described. Two or more of the modified examples described below may be used in combination.

When a specific condition is satisfied, specific processing corresponding to the condition may be performed in addition to or instead of the processing illustrated in FIG. 3. Modified Example 1 to Modified Example 4 are specific examples of this particular processing. For example, when it is intended to make the interactive mode of the projector 1 multifunctional, menus for setting the operation of the functions are complicated, a deeper, larger hierarchical structure has to be included, and an operation required of the user tends to be complicated. However, according to the processing described in the embodiment or the modified examples below, the image area can be controlled according to the movement of the user, and thus the convenience of the user can be increased.

3-1. Modified Example 1

FIG. 5 is a diagram illustrating a transition of the image area in Modified Example 1. In Modified Example 1, when the user moves across the image area and goes outside the image area, the splitting of the image area is canceled. After the splitting of the image area is canceled, the image that has been displayed since before the splitting of the image area is displayed. FIG. 5 shows the image area continued from the time t14 of FIG. 4(D). After the time t14 (FIG. 4(D)), the user U has finished writing on the image WB (writing on the board), and then starts walking to the left of the image area.

Figure 5A:
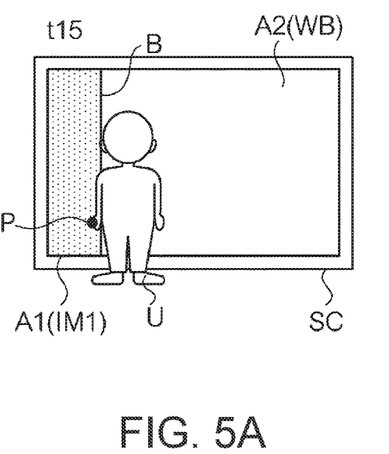
FIG. 5 is a diagram illustrating a transition of the image area in Modified Example 1.

At a time t15 (FIG. 5(A)), the user U moves further to the left from the position where the user U has written on the image WB. The area A2 is expanded and the area A1 is narrowed, compared with those at the time t14.

Figure 5B:
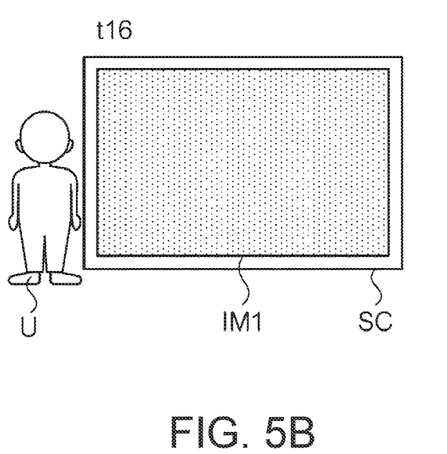

At a time t16 (FIG. 5(B)), the user U goes outside the image area SC. At this time, a condition that the "user has moved across the image area and gone outside the image area" is satisfied, and therefore, the splitting of the image area is canceled and only the image IM1 that has been displayed since before the splitting of the image area is displayed on the image area SC.

According to this example, when the user having finished writing on the board goes outside the image area, the whiteboard automatically disappears, and the user can continue the presentation.

It should be note that, although, in this example, the image IM1 that has been displayed since before the splitting of the image area is displayed after the splitting of the image area is canceled, the whiteboard may be displayed in the entire image area by displaying the image WB. In this case, the user's writing on the board remains thereon, and the user can do additional writing.

3-2. Modified Example 2

FIG. 6 is a diagram illustrating a transition of the image area in Modified Example 2. In the flow of FIG. 3, the image provided with the whiteboard function is displayed in one of the areas after the splitting of the image area. In Modified Example 2, however, the image displayed in one of the areas after the splitting of the image area is determined by input of an instruction by the user.

Figure 6A:
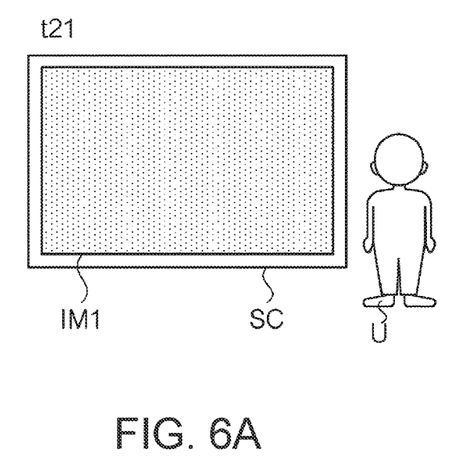
FIG. 6 is a diagram illustrating a transition of the image area in Modified Example 2.

At a time t21 (FIG. 6(A)), the user U is outside the image area SC. In this state, the image area SC is not split, and the image IM1 is displayed. After this, the user U starts walking from outside to inside the image area SC.

Figure 6B:
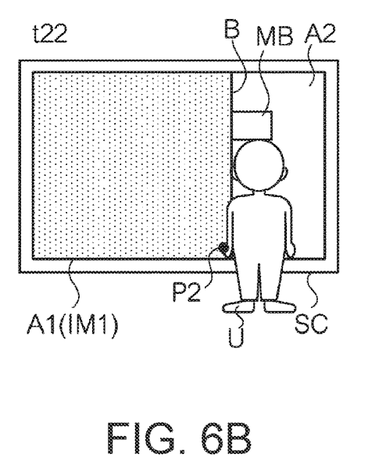

At a time t22 (FIG. 6(B)), the user U is located in the vicinity of the right side of the image area SC, and is pictured in the image area. The representative point P2 at this time is the foremost point in the moving direction (from the right to the left), that is, a point located at the leftmost of a portion where the user U is pictured. Based on the representative point P2, the boundary line B is determined.

At this time, a menu bar MB is displayed at a position specified with the boundary line B as a reference. The menu bar MB is an example of an image object for selecting an image to be displayed in an area after the splitting of the image area. The menu bar MB includes a plurality of tags (not shown). The plurality of tags correspond to different video supply devices. For example, when three video supply devices (which are referred to as video supply devices IS1 to IS3) are connected to the projector 1, three tags corresponding to the video supply devices IS1 to IS3 are displayed. When the user U touches, with the pointing element 20, a position where one of the three tags is displayed, the video supply device corresponding to the tag is selected. An image according to a video signal supplied from the video supply device selected at this time is displayed in the area A2 produced by the splitting of the image area.

It should be noted that the CPU 100 displays a predetermined image (e.g., a uniform, monochrome image) in the area A2 until an instruction to select the video supply device is input. In the example of FIG. 6(B), the video supply device is not selected at a time t22, and no image is displayed in the area A2.

Figure 6C:
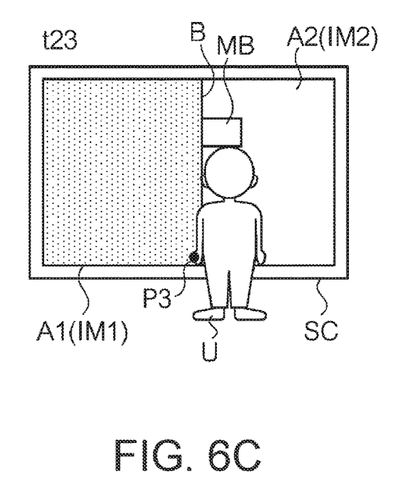

At a time t23 (FIG. 6(C)), the user U reaches the vicinity of the center of the image area SC. At this time, the user U touches, with the pointing element 20, the tag of the video supply device IS2 on the menu bar MB. Then, the CPU 100 displays an image IM2 according to a video signal supplied from the video supply device IS2, in the area A2.

It should be noted that, in the case where, for example, five video supply devices can be connected to the projector 1, when three video supply devices are actually connected thereto, the menu bar MB may include five tags corresponding to video input terminals. Further at this time, the tag of the video input terminal not connected with the device may be displayed with a display attribute, such as grayed out, different from that of the tag corresponding to the video input terminal connected with the device.

Further in this example, the tags included in the menu bar MB may include, not only the tags corresponding to the external video supply devices, but also a tag for activating the whiteboard function of the projector 1.

3-3. Modified Example 3

In the whiteboard function of the projector 1, a toolbar (image object) for setting the attribute of a line (e.g., the width or color of the line) to be drawn is used. When an image provided with the whiteboard function is displayed in the area A2, the display position of the toolbar may be determined according to the moving direction of the user U.

Figure 7A:
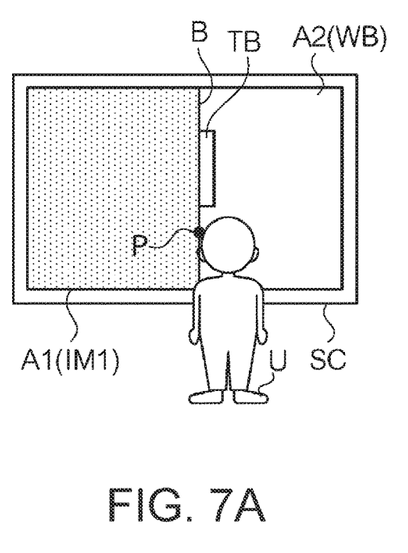
FIG. 7 is a diagram illustrating a transition of the image area in Modified Example 3.
Figure 7B:
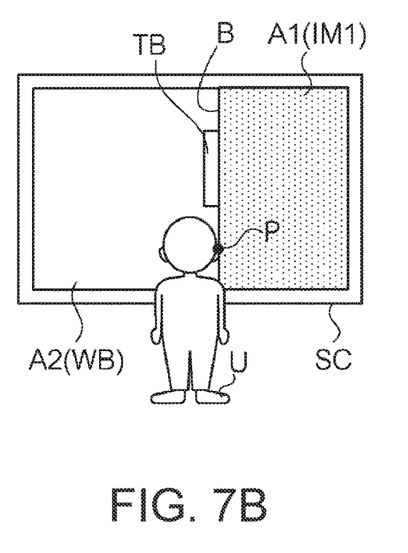

FIG. 7 is a diagram illustrating a transition of the image area in Modified Example 3. In FIG. 7(A), the user U moves from the left to the right of the image area SC. In FIG. 7(B), the user U moves from the right to the left of the image area SC. In this example, a toolbar TB is displayed on the downstream side of the moving direction of the user U, in the area A2. According to this example, the toolbar TB is displayed near the body of the user, and therefore, the user can easily operate the toolbar. It should be noted that, depending on the size or the like of the toolbar, it would be better for the toolbar to be displayed on the upstream side of the moving direction. In this case, the user can operate the toolbar without being interfered with his/her own body.

3-4. Modified Example 4

Control that is independent of the splitting of the image area may be performed. For example, when the user moves from outside the image area to inside the image area in a state where the image IM1 according to the video signal supplied from the video supply device is displayed, the CPU 100 switches the mode to enable the interactive mode. At this time, the splitting of the image area is not performed, and in a state where the image IM1 is displayed on the background, a line (handwritten image) drawn in the interactive mode is displayed on the image IM1 in a superimposed manner. In this case, when the user moves outside the image area, the displayed handwritten image is erased. According to this example, after the user comes close to the image area and finishes writing on the board, only if the user moves outside the image area without taking the time to erase the writing on the board, the writing on the board can be erased.

3-5. Modified Example 5

The dynamical movement of the split position following the movement of the user may be rather inconvenient. Therefore, when an explicit instruction is issued from the user, the movement of the split position may be stopped. That is, in this case, the projector 1 includes a mode in which the split position dynamically moves following the movement of the user (a mode in which the specifying section 14 dynamically specifies the split position, which is referred to as a "moving mode") and a mode in which the split position is fixed (a mode in which the specifying section 14 statically specifies the split position, which is referred to as a "fixed mode"). These modes are set or switched according to an instruction of the user. In this case, the CPU 100 functions as a setting section that sets the operating mode of the specifying section 14.

A transition from the moving mode to the fixed mode (and the opposite transition) with respect to the split position is instructed by, for example, the user touching, with the pointing element 20, an image object (e.g., a button or an icon) displayed on the image area. The image object is displayed at a position (e.g., on the boundary line B) determined with the boundary line B as a reference. Alternatively, the boundary line B may function also as the image object. In this case, when the user touches the boundary line, the moving mode is switched to the fixed mode; and when the user touches the boundary line B one more time, the fixed mode is switched to the moving mode.

3-6. Modified Example 6

The pointing element 20 may have a plurality of attributes (operating modes). In this case, the attributes of the pointing element 20 include a "pointer". The pointer means the function of indicating an area in the image area. In the case where the attribute of the pointing element 20 is set to the pointer, when the user moves from outside the image area to inside the image area, the CPU 100 may display an image of the pointer on the image area. According to this example, a visual effect can be more increased, compared with the case where the image of the pointer continues to be displayed irrespective of the position of the user while the attribute of the pointing element 20 is set to the pointer.

3-7. Other Modified Examples

The algorithm to specify a representative point from a portion where the person is pictured in a captured image is not limited to that illustrated in the embodiment. For example, the center of gravity of the portion where the person is pictured may be specified as a representative point.

The method of specifying a split position from a representative point is not limited to that illustrated in the embodiment. For example, when the foremost point in the moving direction is a representative point, coordinates obtained by adding a predetermined margin (in the moving direction) to the coordinates of the representative point may be specified as a split position. Alternatively, when the backmost point in the moving direction is a representative point, coordinates obtained by adding a predetermined margin (in a direction opposite to the moving direction) to the coordinates of the representative point may be specified as a split position.

A hardware configuration of a projector 1 for realizing the functions of FIG. 1 is not limited to that illustrated in FIG. 2. For example, the projector 1 may detect, using a stereo camera, a position on the image area indicated by the pointing element 20. In another example, the display device may be, not a projector, but a direct-view display device (a liquid crystal display device or an organic EL display device) having a touch screen. Moreover, a portion of the functions shown in FIG. 1 may be omitted.

REFERENCE SIGNS LIST

1 . . . projector
11 . . . input section
12 . . . projecting section
13 . . . imaging section
14 . . . specifying section
15 . . . display control section
16 . . . detecting section
17 . . . drawing section
18 . . . transmitting section
20 . . . pointing element
100 . . . CPU
101 . . . ROM
102 . . . RAM
104 . . . IF unit
105 . . . image processing circuit
107 . . . operating panel
108 . . . camera

The invention claimed is:

1. A projector comprising:
a projecting section that projects an image onto a projection surface;
an imaging section that captures the image projected on the projection surface and a person located between the projecting section and the projection surface, and obtains a captured image;
a specifying section that specifies a split position of the projection surface based on a position of the person in the captured image; and
a display control section that splits the projection surface into a plurality of areas at the split position specified by the specifying section and controls the projecting section so as to project different images in the plurality of areas, wherein
the different images include an existing image projected prior to entry of the person between the projecting section and the projection surface and a new image projected after entry of the person,
the plurality of areas includes at least a first area and a second area, and
the display control section splits the projection surface such that the entire existing image is displayed in the first area and the new image is displayed in the second area.

2. The projector according to claim 1, wherein
the imaging section captures the image projected on the projection surface over time, and
the specifying section dynamically specifies the split position according to a temporal change in the position of the person included in a plurality of captured images captured over time by the imaging section.

3. The projector according to claim 2, further comprising
a setting section that sets an operating mode of the specifying section to any of a plurality of operating modes including a first mode in which the split position is dynamically specified from the plurality of captured images and a second mode in which the split position is statically specified from one image of the plurality of captured images.

4. The projector according to claim 1, further comprising
an input section that accepts input of video signals from a plurality of video supply devices, wherein
the imaging section captures an image including an area outside the image projected by the projecting section, and
when the person moves from outside to inside the image projected by the projecting section, the display control section causes the projecting section to project an image including an image object for selecting one video supply device from the plurality of video supply devices.

5. The projector according to claim 1, wherein
the display control section causes the projecting section to project an image including an image object for inputting an instruction to stop movement of the split position.

6. The projector according to claim 1, further comprising:
a detecting section that detects a position of a pointing element on the image projected on the projection surface; and
a drawing section that draws a line according to a trajectory of the position detected by the detecting section, wherein
the display control section causes the projecting section to project an image including the line drawn by the drawing section, and
when the person moves from inside to outside the image projected by the projecting section, the display control section causes the projecting section to project an image in which the line drawn by the drawing section is erased.

7. The projector according to claim 1, further comprising:
a detecting section that detects a position of a pointing element on the image projected on the projection surface; and
a drawing section that draws a line according to a trajectory of the position detected by the detecting section, wherein
the display control section causes the projecting section to project an image including the line drawn by the drawing section, and
when the person moves from outside to inside the image projected by the projecting section, the display control section displays an image including the line drawn by the drawing section, in one area of the plurality of areas.

8. The projector according to claim 1, wherein
the display control section splits the projection surface by moving the existing image to a position downstream of a moving direction of the person and displaying the new image at a position upstream of the moving direction of the person.

9. The projector according to claim 1, wherein
the new image is a whiteboard that is drawn upon according to a trajectory of an indicator, and
the display control section causes the projecting section to project a toolbar for setting a function of the whiteboard, the toolbar being displayed contacting the existing image and the new image.

10. A display control method comprising:
projecting, by a projecting section, an image onto a projection surface;
capturing the image projected on the projection surface and a person located between the projecting section and the projection surface, and obtaining a captured image;

specifying a split position of the projection surface based on a position of the person in the captured image; and splitting the projection surface into a plurality of areas at the specified split position and projecting different images in the plurality of areas, wherein the different images include an existing image projected prior to entry of the person between the projecting section and the projection surface and a new image projected after entry of the person, the plurality of areas includes at least a first area and a second area, and the splitting of the projection surface is such that the entire existing image is displayed in the first area and the new image is displayed in the second area.

11. The display control method according to claim 10, wherein the splitting of the projection surface includes moving the existing image to a position downstream of a moving direction of the person and displaying the new image at a position upstream of the moving direction of the person.

12. The display control method according to claim 10, wherein the new image is a whiteboard that is drawn upon according to a trajectory of an indicator, and the projecting section projects a toolbar for setting a function of the whiteboard, the toolbar being displayed contacting the existing image and the new image.

* * * * *